(12) United States Patent
Bachmann et al.

(10) Patent No.: US 11,338,693 B2
(45) Date of Patent: May 24, 2022

(54) METHOD FOR CHARGING A BATTERY-OPERATED VEHICLE

(71) Applicant: Bayerische Motoren Werke Aktiengesellschaft, Munich (DE)

(72) Inventors: Fabian Bachmann, Munich (DE); Robert Bobinger, Huegelshart (DE); Elsa Davy, Munich (DE); Norbert Deixler, Unterhaching (DE); Richard Eiletz, Deisenhofen (DE); Sebastian Gielisch, Unterschleissheim (DE); Roland Koenig, Habach (DE); Alfred Pruckner, Munich (DE); Dirk Schlichte, Munich (DE); Hubert Scholz, Munich (DE); Anette Sedlmaier-Fuchs, Holzkirchen (DE); Ludwig Seethaler, Hebertshausen (DE); Stefan Sicklinger, Dachau (DE); Ralf Stroph, Eching (DE); Stefan Stuerzl, Garching (DE); Martin Waldmann, Tutzing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 432 days.

(21) Appl. No.: 16/353,732

(22) Filed: Mar. 14, 2019

(65) Prior Publication Data

US 2019/0210479 A1 Jul. 11, 2019

Related U.S. Application Data

(63) Continuation of application No. PCT/EP2017/071853, filed on Aug. 31, 2017.

(30) Foreign Application Priority Data

Sep. 15, 2016 (DE) ..................... 10 2016 217 615.3

(51) Int. Cl.
*B60L 53/35* (2019.01)
*B60L 15/38* (2006.01)
(Continued)

(52) U.S. Cl.
CPC ............... *B60L 53/35* (2019.02); *B60L 15/38* (2013.01); *B60L 50/15* (2019.02); *B60L 53/00* (2019.02);
(Continued)

(58) Field of Classification Search
CPC .. B60L 15/38; B60L 2240/12; B60L 2240/16; B60L 2240/24; B60L 2240/62;
(Continued)

(56) References Cited

U.S. PATENT DOCUMENTS

| 8,013,570 | B2 * | 9/2011 | Baxter | ................ | H02J 7/00036 |
| | | | | | 320/109 |
| 8,473,135 | B2 * | 6/2013 | Sekijima | ............ | G01C 21/3469 |
| | | | | | 701/22 |

(Continued)

FOREIGN PATENT DOCUMENTS

| CN | 101895144 A | 11/2010 |
| CN | 103904750 A | 7/2014 |

(Continued)

OTHER PUBLICATIONS

International Search Report (PCT/ISA/210) issued in PCT Application No. PCT/EP2017/071853 dated Nov. 23, 2017 with English translation (seven (7) pages).
(Continued)

*Primary Examiner* — Tyler J Lee
(74) *Attorney, Agent, or Firm* — Crowell & Moring LLP

(57) ABSTRACT

A method is provided for charging a battery-operated vehicle having a chargeable traction energy store and a system for autonomously guiding the vehicle with a charg-
(Continued)

ing vehicle having an energy generator and/or an energy store. The method forms at least one electrical coupling between the battery-operated vehicle and the charging vehicle via an autonomous driving manoeuver of the battery-operated vehicle and/or the charging vehicle. A charging of the traction energy store of the battery-operated vehicle occurs via the energy generator and/or the energy store of the charging vehicle during the driving of the paired battery-operated vehicle and charging vehicle.

15 Claims, 2 Drawing Sheets

(51) Int. Cl.
| | |
|---|---|
| *G05D 1/02* | (2020.01) |
| *B60L 53/14* | (2019.01) |
| *B60L 50/15* | (2019.01) |
| *B60L 53/66* | (2019.01) |
| *B60L 53/00* | (2019.01) |
| *B60L 53/126* | (2019.01) |
| *B60L 53/34* | (2019.01) |
| *B60L 53/38* | (2019.01) |
| *G05D 1/00* | (2006.01) |

(52) U.S. Cl.
CPC ............ *B60L 53/126* (2019.02); *B60L 53/14* (2019.02); *B60L 53/34* (2019.02); *B60L 53/38* (2019.02); *B60L 53/665* (2019.02); *G05D 1/0088* (2013.01); *G05D 1/0225* (2013.01); *G05D 1/0291* (2013.01); *G05D 1/0297* (2013.01); *B60L 2240/12* (2013.01); *B60L 2240/16* (2013.01); *B60L 2240/24* (2013.01); *B60L 2240/62* (2013.01); *B60L 2240/70* (2013.01); *B60L 2260/32* (2013.01); *B60Y 2300/28* (2013.01); *G05D 2201/0213* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC .. B60L 2240/70; B60L 2260/32; B60L 50/15; B60L 53/00; B60L 53/126; B60L 53/14; B60L 53/34; B60L 53/35; B60L 53/38; B60L 53/66; G05D 1/0088; G05D 1/0225; G05D 1/0291; G05D 1/0297; G05D 2201/0213; Y02T 10/70; Y02T 10/7072; Y02T 10/72; Y02T 90/12; Y02T 90/14; Y02T 90/16; Y02T 90/167

See application file for complete search history.

(56) References Cited

U.S. PATENT DOCUMENTS

| | | | |
|---|---|---|---|
| 8,583,303 B2* | 11/2013 | Bastien | B60L 1/20 701/22 |
| 9,079,505 B1* | 7/2015 | Hyde | B60L 58/10 |
| 2012/0203409 A1 | 8/2012 | Sekijima et al. | |
| 2012/0299373 A1* | 11/2012 | Yoshida | H02J 7/025 307/9.1 |
| 2012/0299390 A1* | 11/2012 | Kim | H02J 50/12 307/104 |
| 2015/0204741 A1 | 7/2015 | Hagan | |
| 2015/0266389 A1* | 9/2015 | Appelbaum | H02J 7/0027 320/138 |
| 2016/0089988 A1* | 3/2016 | Bartz | B60L 3/00 320/108 |
| 2016/0129793 A1* | 5/2016 | Cronie | B60L 11/182 320/109 |
| 2018/0001777 A1 | 1/2018 | Kilic | |

FOREIGN PATENT DOCUMENTS

| | | |
|---|---|---|
| CN | 104578267 A | 4/2015 |
| CN | 105480108 A | 4/2016 |
| CN | 205311360 U | 6/2016 |
| DE | 10 2009 028 565 A1 | 2/2011 |
| DE | 10 2012 214 750 A1 | 11/2013 |
| DE | 10 2012 015 099 A1 | 2/2014 |
| DE | 10 2012 016 234 A1 | 2/2014 |
| DE | 10 2012 020 592 A1 | 4/2014 |
| DE | 10 2015 200 458 A1 | 7/2015 |
| DE | 10 2014 226 357 A1 | 6/2016 |
| DE | 10 2015 200 636 A1 | 7/2016 |
| EP | 2 709 233 A1 | 3/2014 |
| JP | 11-285109 A | 10/1999 |

OTHER PUBLICATIONS

German-language Written Opinion (PCT/ISA/237) issued in PCT Application No. PCT/EP2017/071853 dated Nov. 23, 2017 (eight (8) pages).

German Search Report issued in counterpart German Application No. 10 2016 217 615.3 dated Aug. 16, 2017 (16 pages).

Chinese-language Office Action issued in Chinese Application No. 201780056796.4 dated Aug. 30, 2021 with English translation (19 pages).

* cited by examiner

METHOD FOR CHARGING A BATTERY-OPERATED VEHICLE

CROSS REFERENCE TO RELATED APPLICATIONS

This application is a continuation of PCT International Application No. PCT/EP2017/071853, filed Aug. 31, 2017, which claims priority under 35 U.S.C. § 119 from German Patent Application No. 10 2016 217 615.3, filed Sep. 15, 2016, the entire disclosures of which are herein expressly incorporated by reference.

BACKGROUND AND SUMMARY OF THE INVENTION

The invention relates to a method for charging a battery operated vehicle comprising a rechargeable traction energy store and system for autonomously driving the vehicle. The invention further relates to a charging vehicle and a system for charging a battery operated vehicle.

Electrically operated vehicles (subsequently referred to as battery operated vehicles) have the problem that long ranges can be realized substantially only with an expensive and heavy, large storage battery. Although it is now possible to use brief rapid charging of the traction energy store to charge the traction energy store with a large amount of energy in a short time, this still requires a substantially longer interim stop—in comparison with a vehicle operated by internal combustion engine—on a longer route. The high weight and high costs of the traction energy store mean that it is therefore possible to attain only relatively low efficiencies for battery operated vehicles.

Another principle for extending a range involves equipping the vehicle with, in addition to the traction energy store, what is known as a range extender, which charges the traction energy store by means of an internal combustion engine using a generator while the vehicle is traveling. This allows greater ranges to be attained in comparison with a battery operated vehicle without such a range extender. However, the limited installation space in a vehicle means that it is not possible to provide a sufficiently large tank for such a range extender. Besides that, costs and weight are adverse in this case too.

Generally, battery operated vehicles still have the problem of range uncertainty or range limitation, however. As such, in particular given real ranges below 250 km, meaningful long-distance operation is not possible. Even the option of recharging the traction energy store using rapid charging processes leads to distinctly longer "charging interruptions" than in the case of a vehicle operated by internal combustion engine. While the installation of substantially larger stores is difficult to realize in practice for the cited cost and weight reasons, alternatives comprising a combination of an internal combustion engine or a hydrogen-based fuel cell with an electric motor are also too expensive for use in mass production.

There is thus the need to provide a simpler and less expensive way of allowing range extension for a battery operated vehicle.

According to a first aspect of the invention, a method is provided for charging a battery operated vehicle, which comprises a rechargeable traction energy store and system for autonomously driving the vehicle, with a charging vehicle, which comprises an energy generator and/or an energy store. The energy to be provided for charging the traction energy store can therefore be provided by the charging vehicle from batteries, a fuel cell, a combination of an internal combustion engine and a generator and the like. The method comprises the steps of: producing at least one electrical coupling between the battery operated vehicle and the charging vehicle by way of an autonomous driving maneuver of the battery operated vehicle or of the charging vehicle; charging the traction energy store of the battery operated vehicle by way of the energy generator and/or energy store of the charging vehicle while the pair comprising the battery operated vehicle and the charging vehicle is traveling.

According to the invention, the range of a battery operated vehicle can be extended by virtue of its traction energy store being charged while traveling. To this end, the battery operated vehicle and a charging vehicle are coupled to form a pair, so that an energy transfer from the charging vehicle to the traction energy store of the battery operated vehicle can be effected. As a result, it is no longer necessary to make a stop to charge or rapidly charge the battery operated vehicle in order to extend the range of a battery operated vehicle. Charging pauses can thereby be avoided.

Ultimately, this results in a practically infinite range for a vehicle with a battery operated drive, since the traction energy store thereof can be recharged at any time while the battery operated vehicle is traveling. This entails the advantage that the traction energy store of the battery operated vehicle can be kept comparatively small. In particular, it can be designed for short or medium distances, since long distance suitability is made possible by virtue of the traction energy store being charged using the charging vehicle. The opportunity to be able to keep the traction energy store of the battery operated vehicle small results in reduced production costs and a decreased sale price for the battery operated vehicle. Since range uncertainty or limitation now recedes, this increases the acceptance of battery operated vehicles. Besides that, the decrease in the size of the traction energy store leads not only to a smaller volume requirement but also to a lower weight, as a result of which the efficiency of the battery operated vehicle further increases.

According to a first variant, the charging vehicle is an autonomous charging vehicle designed for performing autonomous driving maneuvers, wherein the autonomous charging vehicle couples to the battery operated traveling or stationary vehicle by way of an autonomous driving maneuver of the autonomous charging vehicle. This allows the autonomous charging vehicle to be coupled to the battery operated vehicle while the latter is traveling, which means that a charging pause is fundamentally completely avoidable. Similarly, according to this variant, there can be provision for coupling between the autonomous charging vehicle and the battery operated vehicle to be performed during a short pause, e.g. at a rest area.

The battery operated vehicle and the autonomous charging vehicle can be mechanically coupled to one another before the charging process begins and can be mechanically separated from one another after the charging process ends. The mechanical coupling between the battery operated vehicle and the autonomous charging vehicle can be realized in similar fashion to a trailer coupling or a coupling known from trams or trains. Since the coupling and decoupling of the autonomous charging vehicle is supposed to take place while traveling, the coupling mechanism for detaching and holding needs to be designed accordingly.

The battery operated vehicle and the autonomous charging vehicle can also not be mechanically coupled to one another during the charging process, wherein the battery operated vehicle and the autonomous charging vehicle perform a respective autonomous driving maneuver, so that a prescribed positional relation to one another is satisfied. A prescribed positional relation can be a prescribed distance between the autonomous charging vehicle and the battery operated vehicle. The positional relation can also be a prescribed area, in order to permit e.g. a (small) decrease in distance between the two parts when the part traveling ahead slows down or a (small) increase in distance between the two parts when speeding up.

In order to be able to keep to the prescribed positional relation to one another, it is expedient if the battery operated vehicle and the autonomous charging vehicle perform a respective autonomous driving maneuver at least during the charging process or while they are coupled. This is also expedient if there is a mechanical coupling between the battery operated vehicle and the autonomous charging vehicle.

A further configuration provides for a processing unit to respond to receiving a charging request, which comprises a desired location of the charging and/or a desired amount of energy or range for charging and/or a desired time of charging, by ascertaining as criteria the time and/or the location at which the autonomous charging vehicle is supposed to be coupled to the battery operated vehicle transmitting the charging request. The processing unit is in particular a central processing unit that undertakes management of the autonomous charging vehicles in respect of the charging and location of charging of battery operated vehicles. Alternatively, the processing unit can also be a processing unit of the autonomous charging vehicle itself or a cooperative processing unit, formed from multiple processing units, of multiple autonomous charging vehicles. A desired location comprises e.g. a particular road, such as e.g. a particular freeway. The desired location can also characterize a particular area, however, e.g. a freeway on-ramp or a section on a freeway between a location A and a location B, and a distance, e.g. in 150 km. In the latter case, the location is then ascertained on the basis of the driving data of the battery operated vehicle. The processing unit therefore performs planning for the autonomous charging vehicle in order to meet the charging request from a battery operated vehicle at a desired location and/or a desired time.

The processing unit can ascertain which one of a plurality of autonomous charging vehicles in a distributed arrangement best meets the criteria, and can transmit a message to meet the charging request to the selected autonomous charging vehicle. The message "instructs" the selected charging vehicle to undertake the charging at the desired location and/or at the desired time for the battery operated vehicle.

The charging request can be transmitted in computer-aided fashion by a vehicle processing unit of the battery operated vehicle and/or upon request by a user of the battery operated vehicle. By way of example, the vehicle processing unit of the battery operated vehicle can determine what range is still possible under particular driving conditions with the remaining amount of energy that the traction energy store contains. Depending on that, the vehicle processing unit can determine that location at which recharging by an autonomous charging vehicle needs to be effected at the latest, and can transmit an applicable charging request to the processing unit. Alternatively, there can also be provision for the user of the battery operated vehicle himself to prescribe when and/or where "recharging" of the traction energy store of his battery operated vehicle needs to take place.

According to a further configuration, the autonomous charging vehicle can remain coupled to the battery operated vehicle or can decouple therefrom after the charging process ends. In particular, it can be provided for the autonomous charging vehicle to travel in front of or behind the battery operated vehicle. If the autonomous charging vehicle remains coupled to the battery operated vehicle after the charging process ends (this requiring no mechanical coupling), then the autonomous charging vehicle can travel behind the battery operated vehicle, for example in the slipstream.

The autonomous charging vehicle can, after the charging process ends, autonomously travel, in particular in the slipstream of the battery operated vehicle or of another vehicle, to a, in particular the closest, charging station, or autonomously continue traveling on the route on which the battery operated vehicle has been charged until it receives a new charging request. The selection of which of said variants the autonomous charging vehicle chooses after the charging process ends can be performed by the autonomous charging vehicle itself or the central processing unit. The selection can be obtained on the basis of a further charging request from another battery operated vehicle that is in proximity to the autonomous charging vehicle and/or on the basis of the energy content of the energy store of the autonomous charging vehicle and/or the distance to the closest charging station.

In a second alternative, the charging vehicle can be a trailer, wherein the battery operated vehicle couples to the stationary trailer by way of an autonomous driving maneuver. This is effected for example at charging stations, which are set up e.g. in the area of a rest area and the like. As a result of the battery operated vehicle being coupled to the trailer by an autonomous driving maneuver of the battery operated vehicle, it is necessary neither for the user of the battery operated vehicle to take manual action nor for the driver of the battery operated vehicle to prompt this. As a result, it is possible for the recharging of the traction energy store of the battery operated vehicle to be performed without substantial loss of time.

In both variants, it is expedient if the battery operated vehicle is controlled autonomously during the charging process. This is in particular intended to ensure that the coupling between the two parts is not unintentionally broken as a result of a rash driving maneuver. The autonomous control of the battery operated vehicle during the charging process allows said vehicle to be controlled anticipatorily by means of a vehicle-to-vehicle communication (car-to-car communication, C2C) and a vehicle-to-infrastructure communication, C2I).

The energy transfer from the charging vehicle to the battery operated vehicle can be effected either by means of a plug-in connection or inductively.

According to a second aspect, the invention provides an autonomous charging vehicle comprising the following: an energy generator and/or an energy store; a coupler for transferring energy from the energy generator and/or the energy store to the traction energy store to be charged in the battery operated vehicle; a communication unit for receiving a charging request; and a system for autonomously driving the vehicle. The function of said components has already been described above.

Expediently, a volume beneath a vehicle outer skin of the autonomous charging vehicle is occupied substantially completely by the energy generator and/or energy store. The autonomous charging vehicle is thus in particular not a conventional vehicle intended for conveying people. Rather, it is a vehicle designed exclusively for transporting the energy generator and/or energy store for the purpose of charging a traction energy store of one or more battery operated vehicles. To this end, the autonomous charging vehicle is capable of taking part in road traffic completely autonomously. The charging vehicle is expediently controlled under the control of the (central) processing unit already described at the outset.

The coupler can have a plug-contact or a coil for inductive energy transfer. The plug-contact or the coil can be mounted on a drawbar or a swivelable arm, for example, in order to mechanically or inductively couple to a corresponding counterpart on the battery operated vehicle. To this end, the battery-operated vehicle can likewise have its coupler on a drawbar or a swivelable arm.

According to a third aspect, the invention comprises a system for charging a battery operated vehicle comprising a rechargeable traction energy store and system for autonomously driving the vehicle. The system comprises at least one charging vehicle of the type described above.

The system further comprises a processing unit for managing the at least one charging vehicle in respect of the charging and/or the location of charging of the battery operated vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
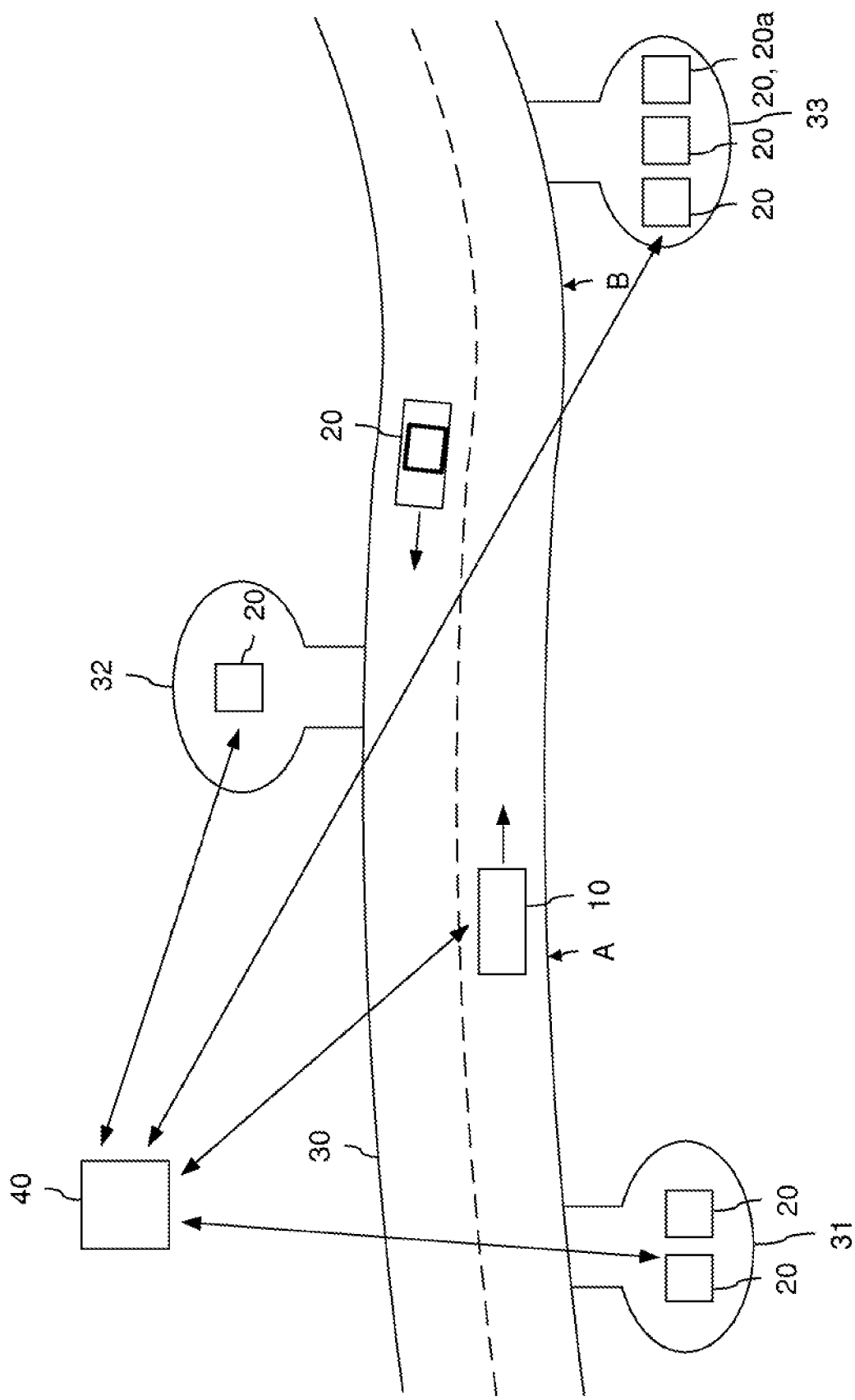
FIG. 1 is a schematic diagram of a road section along which a battery operated vehicle is moving that is supposed to be charged according to an exemplary method of the present invention.

FIG. 1 shows a schematic diagram of a road section of a road 30 along which a battery operated vehicle 10 is moving. The battery operated vehicle 10 is situated at a location A at a present time. Various charging stations 31, 32, 33 are distributed along the road 30. The charging stations 31, 32, 33 can be rest areas, filling stations or the like, depending on the type of road. By way of example, the two charging stations 31, 33 are situated in the direction of travel of the battery operated vehicle 10 (see arrow). The charging station 32 is situated in a direction opposite the direction of travel of the battery operated vehicle 10.

At the charging stations 31, 32, there is provision for a respective number of charging vehicles 20. The charging vehicles 20 are autonomous charging vehicles designed for performing autonomous driving maneuvers, or are a trailer. Additionally, by way of example, an autonomous charging vehicle 20 is situated on the road 20, said charging vehicle moving toward the battery operated vehicle 10 in the opposite direction therefrom. The remainder of the description describes the method with reference to autonomous charging vehicles 20.

Figure 2:
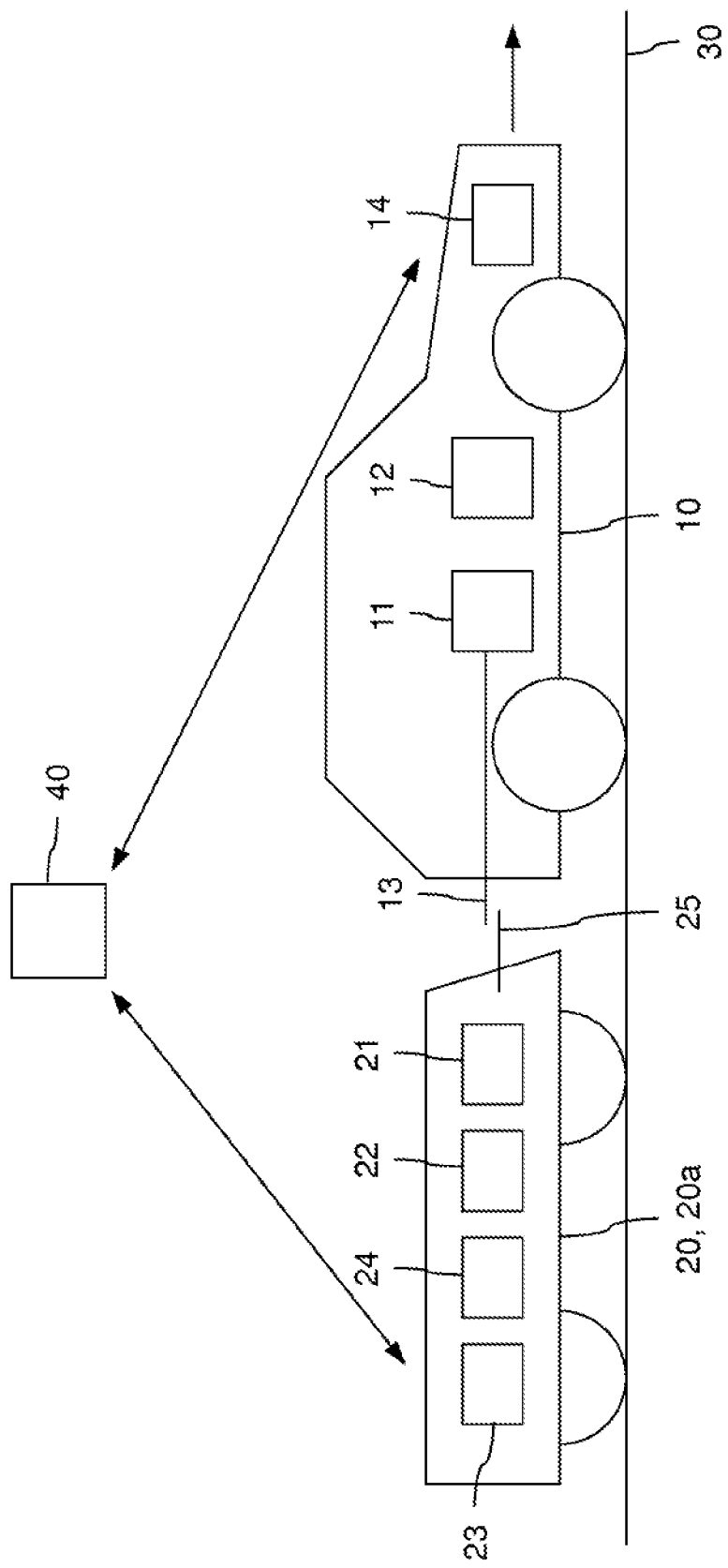
FIG. 2 is a schematic diagram of a pair comprising a battery operated vehicle to be charged and an autonomous charging vehicle.

A respective charging vehicle 20 comprises an energy generator 21 and/or an energy store 22, as is depicted in FIG. 2. The energy generator 21 and/or the energy store 22 are used to provide a traction energy store 11 of the battery operated vehicle 10 a particular amount of energy or amount of charge by way of a charging process. The energy provided by the autonomous charging vehicle can be provided from batteries, a fuel cell, a combination of an internal combustion engine and a generator, and the like.

The autonomous charging vehicles 20, one of which is depicted schematically in FIG. 2, comprise not only the energy generator 21 and/or the energy store 22 but also a communication unit 23, a means 24 for autonomously driving the charging vehicle and a coupler 25. The communication unit 23 of a respective charging vehicle 20 is designed to perform processing operations and to interchange data with a central processing unit 40. As the schematic depiction of FIG. 2 shows, the autonomous charging vehicle is not a conventional vehicle whose bodywork is designed for conveying people. Rather, the outer skin of the charging vehicle 20 is designed such that the volume situated beneath the vehicle outer skin is occupied substantially completely by said components, in particular the energy generator 21 and/or the energy store 22.

As depicted schematically in FIG. 2, the battery operated vehicle 10 comprises not only the traction energy store 11 but also a means 12 for autonomously driving the vehicle, a coupler 13 and a vehicle processing unit 14. The vehicle processing unit 14 is designed for performing computation operations and for communication with the superordinate, central processing unit 40.

The central processing unit 40 is a processing unit designed to undertake management of the autonomous charging vehicles 20 in respect of the charging of the battery operated vehicle 10. The central processing unit 40 can be a single computer or a collection of distributed computers. In another configuration, the function of the central processing unit 40 can also be undertaken by the processing unit of one or more of the autonomous charging vehicles 20. As indicated by the arrows in FIG. 1, the central processing unit 40 is designed for communication with the charging vehicles 20 and the battery operated vehicle 10.

In order to overcome or at least reduce the problems of range uncertainty and range limitation of the traction energy store 11 of the battery operated vehicle 10, there is provision for the traction energy store 11 of the battery operated vehicle 10 to be charged by the energy generator 21 and/or energy store 22 of the charging vehicle 20 while traveling. To this end, at least one electrical coupling between the battery operated vehicle 10 and the charging vehicle 20, and optionally a mechanical coupling between them, is produced, the coupling being effected by way of an autonomous driving maneuver of the battery operated vehicle and/or one of the charging vehicles 20.

The coupling to form a pair is depicted schematically in FIG. 2. The coupler 13 of the battery operated vehicle 10 is embodied by way of example as a drawbar formed on the back. The front of the charging vehicle likewise has a drawbar, on which there is provision for the coupler 25. At a sufficiently short distance, the couplers 13, 25 can engage in one another or overlap one another (as depicted by way of example in FIG. 2) in order to allow an energy transfer from the energy generator 21 and/or the energy store 22 to the traction energy store 11 of the battery operated vehicle 10 by means of plug-in connection or inductive transfer.

So that a charging pause for charging the traction energy store 11 of the battery operated vehicle 10 can be avoided, there is provision for the charging vehicle 20 to approach the battery operated vehicle 10, e.g. from behind, while it is traveling, until the coupler 13 of the battery operated vehicle 10 and the coupler 25 of the charging vehicle 20 are positioned in relation to one another such that an electrical energy transfer is possible. The charging vehicle 20 approaches the battery operated vehicle 10 in this case by virtue of an autonomous driving maneuver, at least of the autonomous charging vehicle 20, being performed. Additionally, in order to facilitate the coupling maneuver, there can also be provision for the battery operated vehicle 10 to be controlled autonomously using the means 12 for autonomously driving the vehicle.

If there is provision for a mechanical coupling between the battery operated vehicle 10 and the charging vehicle 20, then it is expedient if the charging vehicle 20 approaches the battery operated vehicle 10 from behind. As a result, a user sitting in the battery operated vehicle 10 has a familiar driving sensation in that he has a clear view ahead.

A mechanical coupling between the battery operated vehicle 10 and the charging vehicle 20 is not imperative, however. As such, the battery operated vehicle 10 and the autonomous charging vehicle 20 can be controlled in relation to one another, by way of their respective systems 12, 24 for autonomously driving the vehicle or charging vehicle, such that a distance or a positional relation to one another that is required for charging is kept constant. To this end, the battery operated vehicle 10 and the charging vehicle 20 can interchange data (e.g. by way of a car-to-car communication) in order to coordinate driving maneuvers. The positional relationship can also comprise a distance range between the two vehicles, e.g. in order to permit a (small) decrease in distance when the battery operated vehicle 10 traveling ahead slows down. Similarly, a (small) increase in distance can be permitted when the battery operated vehicle 10 traveling ahead speeds up. If it is not possible to keep to the positional relationship on account of an unforeseen event, then the couplers 13, 25 are designed such that they can detach from one another, so that the battery operated vehicle 10 and the autonomous charging vehicle 20 continue traveling at least intermittently independently and autonomously.

Depending on whether the battery operated vehicle 10 or the autonomous charging vehicle 20 is the vehicle traveling ahead, the vehicle traveling ahead undertakes the driving task for the autonomous driving mode. The surroundings data captured by sensors of the battery operated vehicle 10 and the autonomous charging vehicle 20 are interchanged between the two vehicles, since some sensors are concealed between the vehicles after coupling occurs.

The traction energy store 11 is coupled and charged by the autonomous charging vehicle 20 in response to receiving a charging request. At the time at which the charging request is transmitted, the battery operated vehicle 10 is at the present location denoted by A in FIG. 1. The charging request is transmitted to the central processing unit 40 via the vehicle processing unit 14 and applicable communication means, not depicted in more detail, of the battery operated vehicle 10. The charging request transmitted by the battery operated vehicle 10 comprises a desired location of charging and/or a desired amount of energy or range for charging and/or a desired time of charging. The desired location of charging comprises e.g. a particular location, in the exemplary embodiment of FIG. 1 a future location B, which is just in front or in the area of the charging station 33. Generally, such a location can be output for example as a particular freeway on-ramp or off-ramp or as a particular area, e.g. on a freeway between Nuremberg and Wurzburg or the location defined by a distance from the present location A of the battery operated vehicle 10. The time can be a specific time, e.g. 10:00 hours. Similarly, a piece of time information can be charging "within the next half an hour".

The charging request can be produced in automated fashion by the battery operated vehicle 10. To this end, for example the vehicle processing unit 14 can evaluate the present SOC (state of charge) of the traction energy store 11, the current speed of the vehicle 10, a journey destination, optionally input in a navigation system, taking into consideration the chosen route of travel, and the like. This then results in a piece of information concerning the location and/or the time at which charging is desired or required at the latest. Alternatively, the information that the charging request contains can be prescribed by a user of the battery operated vehicle 10 himself. Similarly, a combination of a charging request produced in computer-aided fashion and, if need be, a correction by the user is possible.

The processing unit 40 receiving the charging request determines as criteria the time and/or the location at which an autonomous charging vehicle 20 is supposed to be coupled to the battery operated vehicle 10 transmitting the charging request. To this end, the processing unit 40 takes into consideration the distribution of the charging vehicles 20 along the road 30 on which the battery operated vehicle 10 is traveling. If the charging request includes the criterion that charging of the traction energy store 11 of the battery operated vehicle 10 is desired in the area of the point denoted by B on the road 30, then the processing unit 40 determines that one of the charging vehicles 20 situated in the area of the charging station 33 is supposed to undertake charging of the traction energy store 11 as the selected charging vehicle 20a. The central processing unit 40 then transmits a message to the selected charging vehicle 20 to meet the charging request. This message can be for example the information concerning the time at which the selected charging vehicle 20a is supposed to leave the charging station 33 and go to the road 30 to perform the coupling to the battery operated vehicle 10. The autonomous charging vehicle 20a can go up to the road 30 for example almost in sync with the battery operated vehicle 10 traveling past.

After the charging process ends, the autonomous charging vehicle 20a can remain still coupled to the battery operated vehicle 10 as far as the next charging station (not visible in FIG. 1). Alternatively, the autonomous charging vehicle 20a can detach from the battery operated vehicle 10 after the charging process ends, e.g. in order to meet the charging request of a further vehicle moving on the road 30.

The autonomous charging vehicles 20 are stationed and charged at the charging stations 31, 32, 33, which are set up e.g. beside major roads and/or freeways. The autonomous charging vehicles 20 are not firmly associated with any of the charging stations 31, 32, 33 in this case, but rather, after the charging task ends, decouple from the battery operated vehicle 10 for charging and travel e.g. to the closest charging station, where the energy store of the autonomous charging vehicles is recharged if need be.

In order to ensure a good level of availability of the autonomous charging vehicles 20, there can be provision for a self-learning system e.g. a neural network, which position the charging vehicles 20 favorably along the road 30 according to the expected utilization level. Fundamentally, the autonomous charging vehicles 20 act autonomously, but can have their functions monitored and remotely maintained by the processing unit 40. At a charging station 31, 32, 33, the autonomous charging vehicles 20, while being charged from a power grid, can be used for local, intelligent buffering of the power grid.

The drive for the autonomous charging vehicles 20, and also the electrical energy they provide, can be provided purely electrically, in hybrid fashion with an internal combustion engine or by way of a fuel cell. Purely electrically operated autonomous charging vehicles can be charged at the charging stations 31, 32, 33 both via a power grid and via fixed fuel cell generators or other small power plants, e.g. in solar- or wind-based fashion.

The energy stores used in an autonomous charging vehicle 20 can be what are known as second-life components for reasons of cost, which no longer provide adequate performance for use as traction energy stores in a battery operated vehicle 10.

If the battery operated vehicle 10 and/or the autonomous charging vehicles 20 are provided with appropriate coupling devices, accordingly equipped vehicles can also supply one another with power and be coupled to one another to form a unit, in a similar manner to a train. As a result, it is also possible for a battery operated vehicle to become the provider of electrical energy for another battery operated vehicle, for example. In particular, this variant allows a bidirectional flow of energy, and an energy transfer can take place within the unit, in particular it is possible for electrical balancing toward the "towing vehicle" to take place, said towing vehicle also having the highest energy consumption on account of the highest air resistance.

As described by way of introduction, the charging vehicle can also be in the form of a charging trailer. In this case, a coupling process is effected autonomously by the battery operated vehicle 10 for charging. A charging vehicle in the form of a charging trailer can be kept at different charging stations 31, 32, 33, as depicted schematically in FIG. 1. The charging request and reservation of a charging trailer are made by the battery operated vehicle for charging (in computer-aided fashion or by the user) on request and with the mediation of the central processing unit 40. In this case, the processing unit 40 in turn ascertains the optimum time and/or location at which the battery operated vehicle 10 for charging is supposed to perform a coupling process to couple to a charging trailer. By way of example, the user of the battery operated vehicle 10 for charging receives from the processing unit 40 the message that he is supposed to head for the charging station 33 to couple to a selected charging trailer.

To couple and decouple the charging trailer, the battery operated vehicle 10 for charging needs to leave the road 30 briefly. The coupling process takes place in automated fashion, which means that the user of the battery operated vehicle 10 for charging does not need to leave it.

After the charging process ends, said charging process again being effected while traveling along the road 30, the charging trailer remains on the charged battery operated vehicle 10 as far as the next charging station. The coupling between the battery operated vehicle 10 for charging and the charging trailer 20 is effected mechanically. The energy transfer can be effected by a plug-in connection or inductively.

The charging trailers are again stationed and charged at the charging stations 31, 32, 33, which are provided for along the major roads/freeways. The charging trailers are not associated with a fixed charging station 31, 32, 33, but rather are autonomously decoupled and recharged at the closest charging station after the charging task ends.

In order to ensure a good level of availability of the charging trailers, a self-learning system, e.g. a neural network, can position the charging trailers at the charging stations according to an expected utilization level. To this end, the driver of the battery operated vehicle 10 can receive the prompt, after the charging process ends, regarding that one of the charging stations at which the charging trailer is to be decoupled.

LIST OF REFERENCE SIGNS

10 battery operated vehicle
11 traction energy store
12 system for autonomously driving the vehicle 10
13 coupler
14 vehicle processing unit
20 charging vehicle
20*a* selected charging vehicle
21 energy generator
22 energy store
23 communication unit
24 system for autonomously driving the charging vehicle 20
25 coupler
30 road
31 charging station
32 charging station
33 charging station
40 central processing unit
A present location of the vehicle 10
B location at which charging process is supposed to be begun The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for charging a battery operated vehicle with a charging vehicle, the battery operated vehicle comprising a rechargeable traction energy store and a system for autonomously driving the vehicle, and the charging vehicle comprising one or both of an energy generator and an energy store, the method comprising the steps of:
   producing at least one electrical coupling between the battery operated vehicle and the charging vehicle by way of an autonomous driving maneuver of the battery operated vehicle and/or of the charging vehicle to form a paired battery operated vehicle and charging vehicle; and
   charging the traction energy store of the battery operated vehicle by way of the energy generator and/or the energy store of the charging vehicle while the paired battery operated vehicle and charging vehicle is traveling,
   wherein the battery operated vehicle and the charging vehicle are mechanically coupled to one another before the charging step begins and are mechanically separated from one another after the charging step ends.

2. The method as claimed in claim 1, wherein
   the charging vehicle is an autonomous charging vehicle configured to perform autonomous driving maneuvers, wherein the autonomous charging vehicle couples to a battery operated traveling or stationary vehicle by an autonomous driving maneuver of the autonomous charging vehicle.

3. The method as claimed in claim 2, wherein
   a processing unit responds to receiving a charging request, which comprises a desired location of the charging and/or a desired amount of energy or range for charging and/or a desired time of charging, by determining as criteria the time and/or the location at which the autonomous charging vehicle is supposed to be coupled to the battery operated vehicle transmitting the charging request.

4. The method as claimed in claim 3, wherein
the processing unit determines which one of a plurality of autonomous charging vehicles in a distributed arrangement best meets the criteria, and transmits a message to meet the charging request to the selected autonomous charging vehicle.

5. The method as claimed in claim 3, wherein
the charging request is transmitted in computer-aided fashion by a vehicle processing unit of the battery operated vehicle and/or of a request by a user of the battery operated vehicle.

6. The method as claimed in claim 2, wherein
the autonomous charging vehicle travels in front of or behind the battery operated vehicle.

7. The method as claimed in claim 2, wherein the autonomous charging vehicle, after the charging process ends:
(i) autonomously travels to a charging station; or
(ii) autonomously continues traveling on a route on which the battery operated vehicle has been charged until receiving a new charging request.

8. The method as claimed in claim 7, wherein
the autonomous charging vehicle, after the charging process ends, autonomously travels in a slipstream of the battery operated vehicle or of another vehicle to the charging station.

9. The method as claimed in claim 1, wherein
the charging vehicle is a trailer, and
the battery operated vehicle couples to the trailer by an autonomous driving maneuver.

10. The method as claimed in claim 1, wherein
the battery operated vehicle is controlled autonomously during the charging step.

11. The method as claimed in claim 1, wherein
energy transfer from the charging vehicle to the battery operated vehicle is effected by a plug-in connection or inductively.

12. An autonomous charging vehicle, comprising:
an energy generator and/or an energy store;
a coupler for transferring energy from the energy generator and/or the energy store to a traction energy store to be charged in a battery operated vehicle;
a communication unit for receiving a charging request; and
a system for autonomously driving the vehicle,
wherein a volume beneath a vehicle outer skin is occupied substantially completely by the energy generator and/or the energy store.

13. The autonomous charging vehicle as claimed in claim 12, wherein
the coupler has a plug-in contact or a coil for inductive energy transfer.

14. A system for charging a battery operated vehicle, comprising:
a rechargeable traction energy store; and
a system for autonomously driving the battery operated vehicle, and
at least one charging vehicle as claimed in claim 12.

15. The system as claimed in claim 14, further comprising:
a processing unit for managing the at least one charging vehicle with respect to charging and/or a location of charging of the battery operated vehicle.

* * * * *